US006991170B2

(12) United States Patent
Hirasawa et al.

(10) Patent No.: US 6,991,170 B2
(45) Date of Patent: Jan. 31, 2006

(54) CARD EJECTING MECHANISM

(75) Inventors: Kenji Hirasawa, Nagano (JP); Shigeyuki Nagata, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 10/473,653

(22) PCT Filed: Apr. 12, 2002

(86) PCT No.: PCT/JP02/03695

§ 371 (c)(1),
(2), (4) Date: Oct. 2, 2003

(87) PCT Pub. No.: WO02/084581

PCT Pub. Date: Oct. 24, 2002

(65) Prior Publication Data

US 2004/0094629 A1    May 20, 2004

(30) Foreign Application Priority Data

Apr. 12, 2001 (JP) ............................. 2001-114403

(51) Int. Cl.
*G06K 13/04* (2006.01)

(52) U.S. Cl. ...................... 235/479; 235/475
(58) Field of Classification Search ............... 235/379, 235/380, 453, 475, 479–481, 482, 483, 485, 235/486, 492

See application file for complete search history.

(56) References Cited

U.S. PATENT DOCUMENTS

| | | | |
|---|---|---|---|
| 4,724,310 A * | 2/1988 | Shimamura et al. | 235/483 |
| 4,926,032 A * | 5/1990 | Shimamura et al. | 235/441 |
| 4,931,622 A * | 6/1990 | Ohtsuki et al. | 235/487 |
| 5,300,763 A * | 4/1994 | Ito et al. | 235/475 |
| 6,149,064 A * | 11/2000 | Yamaoka et al. | 235/479 |
| 6,174,186 B1 * | 1/2001 | Hashiguchi et al. | 439/260 |
| 6,382,995 B1 * | 5/2002 | Bricaud et al. | 439/159 |
| 6,779,723 B2 * | 8/2004 | Nakabo | 235/451 |

FOREIGN PATENT DOCUMENTS

| | | |
|---|---|---|
| JP | 11-296624 | 10/1999 |
| JP | 2001-67435 | 3/2001 |

* cited by examiner

*Primary Examiner*—Karl D. Frech
*Assistant Examiner*—Kumiko C. Koyama
(74) *Attorney, Agent, or Firm*—Notaro & Michalos P.C.

(57) ABSTRACT

A card forcible ejection mechanism used to forcibly discharge a card retained in a card reader can be set in a small space and can be attached during a post-assembling step. The mechanism has a carriage which can move along a carriage direction of a card and is provided separately from a card carrying device and at least one claw which is provided on the carriage and can protrude/retract to/from a card carriage path: A carriage moving device for moving the carriage to a claw retracing position and a claw protruding position, and a claw protruding/retracting mechanism which retracts the claw from the card carriage path when the carriage is placed at the claw retracting position and protrudes the claw to the card carriage path when the carriage is placed at the claw protruding position, are also provided.

5 Claims, 7 Drawing Sheets

CARD EJECTING MECHANISM

TECHNICAL FIELD

The present invention relates to a card forcible ejection mechanism provided to a card reader using a card having a magnetic stripe, an IC card, or various kinds of cards on which information can be recorded. More particularly, the present invention relates, to a card forcible ejection mechanism used to forcibly eject a card retained inside a card reader.

BACKGROUND ART

If a card to be inserted into a card reader is a normal card without a deformation or a stain, carriage of the card in the card reader can be performed without causing any problem. However, when a deformed card or a stained card is inserted into the card reader, a so called jam that the card is retained in a card carriage path may occur, and the card cannot be processed in some cases.

Further, even in case of a normal card, the jam may occur if a person who tries to steal any other person's card manipulates a part of the card reader in the vicinity of a card insertion opening thereof. In this case, even if the card generates the jam and the card owner leaves there, it is difficult to take out the card when a shutter of the card insertion opening is completely closed. Therefore, a possibility of a theft is small. However, when the card stays in a movement range of the shutter and the shutter cannot closes because it is in contact with the card, the card may be possibly taken out after the card owner leaves there.

Thus, a card forcible ejection mechanism has been conventionally provided in the card reader on the assumption that the card generates the jam. FIG. 11 shows an example of the conventional card forcible ejection mechanism in the card reader. In the drawing, three pairs of carriage rollers 82, 84 and 86 are arranged from a card insertion opening 88 side toward an inner side in the mentioned order at appropriately intervals with a card carriage path 80 between each pair. Therefore, a card inserted from the card insertion opening 88 is sequentially carried toward the inner side by the carriage roller pairs 82, 84 and 86, and predetermined processing, i.e., reading or writing of recording information is carried out.

A card forcible ejection mechanism is provided along the entire area of the card carriage path 80 below the card carriage path 80. This card forcible ejection mechanism includes: sprockets 92 and 94 arranged so as to be opposed to each other on the card insertion opening 88 side and the inner side of the card carriage path 80 and; a chain 90 wound around the respective sprockets 92 and 94; and a craw 91 disposed to a part of the chain 90. The upper portion of the chain 90 is positioned in parallel with the card carriage path 80 in the vicinity of the card carriage path 80.

When the card is not retained, the chain 90 is not driven, and the craw 91 is retracted from the card carriage path 80 as shown in FIG. 11. When it is detected that the card generated the jam, at least one of the sprockets 92 and 94 is rotated and driven, the chain 90 is turned, the craw 91 is raised in the card carriage path 80, and the card causing the jam is forcibly thrusted toward the card insertion opening 88 or the rear side.

Here, when the sprockets 92 and 94 are rotated in the clockwise direction in the drawing at the time of occurrence of the jam, the card is ejected from the card insertion opening 88. Furthermore, when the sprockets 92 and 94 are rotated in the counterclockwise direction in the drawing, the card is carried to a card disposition box (not shown) provided on the inner side of the card reader to be collected.

However, in the above-described card forcible ejection mechanism, since the chain 90 is provided over the entire area of the card carriage path 80 in order to feed the card retained in the card carriage path 80 to the card insertion opening 88 or the card disposition box, an empty space may be insufficient and the card forcible ejection mechanism may not be provided depending on a structure of the card reader. Moreover, since the card forcible ejection mechanism has a large size that it extends over the entire area of the card carriage path 80, it is very difficult to provide this mechanism to the card reader on a post-assembling step as an option.

Thus, it is an object of the present invention to provide a card forcible ejection mechanism which can be installed in a small space and provided to a card reader on a post-assembling step as an option.

DISCLOSURE OF INVENTION

To achieve this aim, according to the present invention, there is provided a card forcible ejection mechanism which is provided to a card reader including a card carrying means for carrying a card inserted from a card insertion opening in a card carriage path, and forcibly ejects the card retained in the card carriage path, comprising: a carriage which is movable in a carriage direction of the card and provided separately from the card carrying means; at least one claw which is provided to the carriage and can protrude/retract to/from the card carriage path; a carriage moving means for moving the carriage to a claw retracting position and a claw protruding position; and a claw protruding/retracting mechanism which retracts the claw from the card carriage path when the carriage is positioned at the claw retracting position and protrudes the claw in the card carriage path when the carriage is positioned at the claw protruding position.

Therefore, since the card forcible ejection mechanism can be set only in the vicinity of the card insertion opening so as to discharge the card retained in the card reader to the card insertion opening, the card forcible ejection mechanism does not have to be provided over the entire card carriage path, thereby reducing the card forcible ejection mechanism in size. Accordingly, even if the card reader with a small empty space is used, the card forcible ejection mechanism can be provided thereto.

Moreover, the entire card forcible ejection mechanism according to the present invention is realized as a unit, and it is attached to the card reader. In this case, it can be provided to the card reader on a post-assembling step as an option.

Additionally, in the present invention, the card carrying means includes carriage rollers, and the entire card forcible ejection mechanism may be accommodated between the adjacent carriage rollers in the carriage direction. In this case, the card forcible ejection mechanism realized as a unit can be accommodated within the card reader without producing a wasteful space. Therefore, the card reader can be reduced in size.

Further, in the present invention, the shutter which opens and closes the card insertion opening is provided, and the claw protruding position is arranged on the shutter side away from the claw retracting position so that the card may be forcibly discharged only when the shutter cannot be closed because it is in contact with the retained card.

In this case, since discharging the card only when the retained card obstructs the closing operation of the shutter can suffice, the card forcible ejection mechanism can be provided only in the vicinity of the shutter. As a result, the card forcible ejection mechanism does not have to be provided over the entire card carriage path, and the card forcible-ejection mechanism can be reduced in size.

Further, since the retained card is immediately discharged and returned to a user when the shutter is not closed, it is possible to prevent a stranger from stealing the card when the card is retained with the shutter being not closed and a user walks away from the card reader.

Furthermore, in the present invention, the claw retracted from the card carriage path and the shutter may be separated from each other by a distance corresponding to a length of at least one card in the carriage direction. In this case, the claw can be necessarily brought into contact with a rear end of the card retained at a position of the shutter.

BEST MODE FOR CARRYING OUT THE INVENTION

Figure 1:
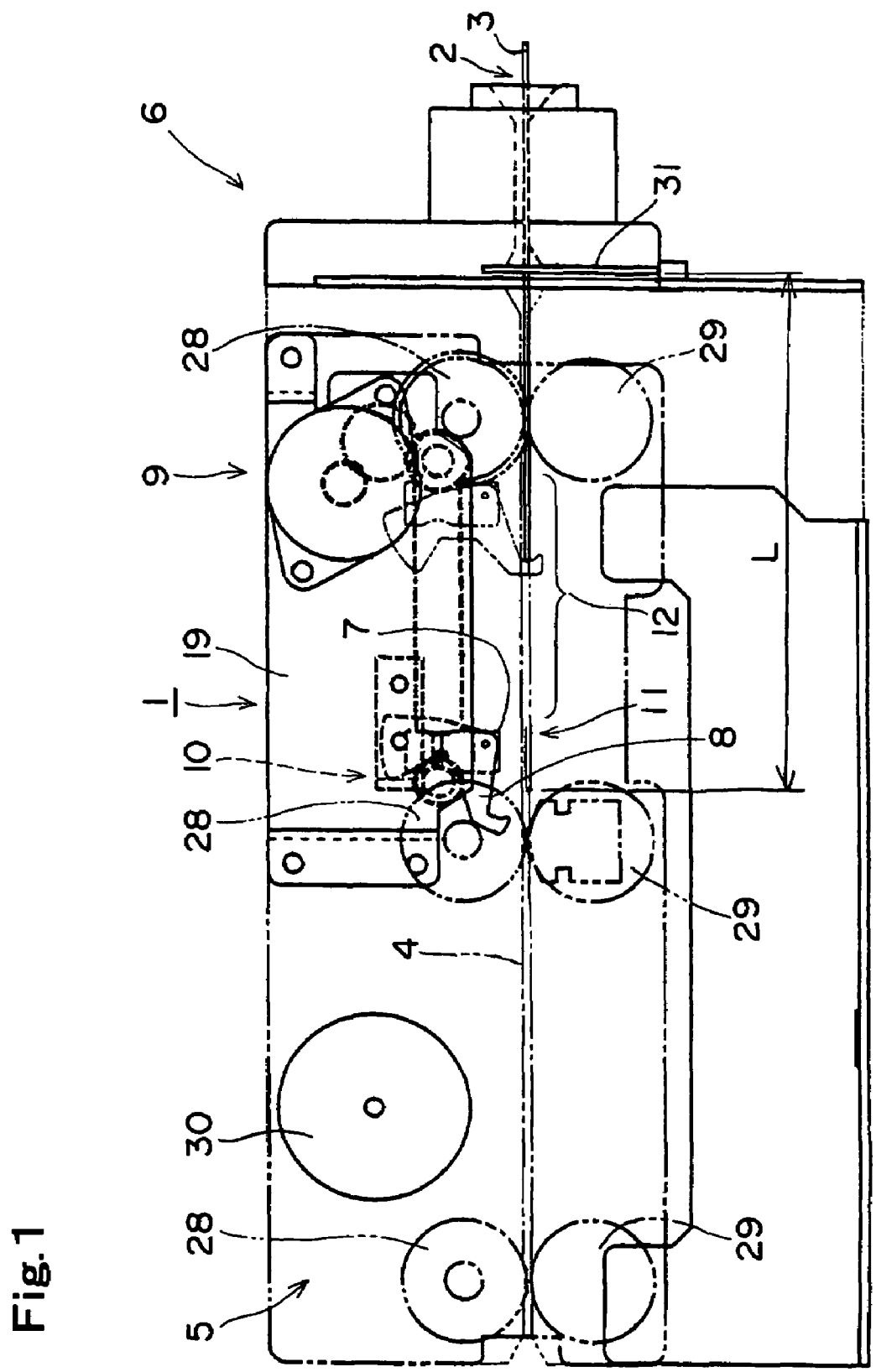
FIG. 1 is a schematic side view showing a card reader on which a card forcible ejection mechanism according to the present invention is mounted.

A structure of the present invention will now be described in detail hereinafter based on an example of the illustrated mode. FIGS. 1 to 6 show an embodiment of a card forcible ejection mechanism 1 according to the present invention. This card forcible ejection mechanism 1 is provided to a card reader 6 including a card carrying means 5 for carrying a card 3 inserted from a card inserting opening 2 in a card carriage path 4, and forcibly ejects the card 3 retained in the card carriage path 4. This card forcible ejection mechanism 1 includes a carriage 7 which can move in a carriage direction of the card 3 and is provided separately from the card carrying means 5, at least one claw 8 which can protrude/retract to/from the card carriage path 4, carriage moving means 9 for moving the carriage 7, and a claw protruding/retracting mechanism 10 which protrudes/retracts the claw to/from the card carriage path 4. Further, the entire card forcible ejection mechanism 1 is realized as a unit, and can be attached to the card reader 6. Therefore, the card forcible ejection mechanism 1 can be attached to the card reader 6 on a post-assembling step as an option. Furthermore, since the card forcible ejection mechanism 1 can be set only in the vicinity of the card insertion opening 2 so that the card 3 retained in the card reader 6 can be discharged from the card insertion opening 2, the card forcible ejection mechanism 1 does not have to be provided over the entire card carriage path 4, thereby reducing the card forcible ejection mechanism 1 in size. In this embodiment, the card forcible ejection mechanism 1 is arranged on an upper side of the card carriage path 4.

Figure 2:
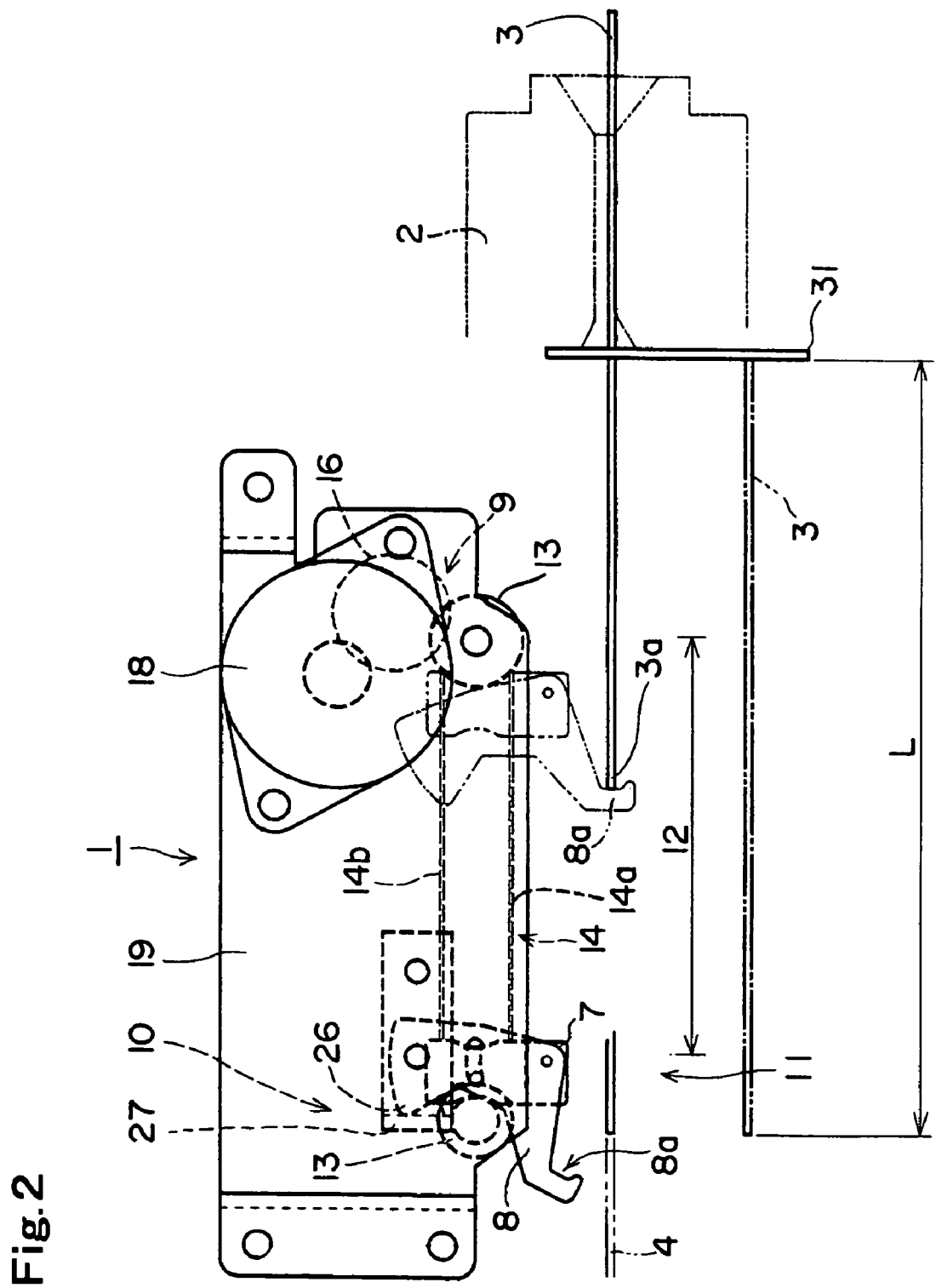
FIG. 2 is a side view showing a card forcible ejection mechanism.
Figure 3:
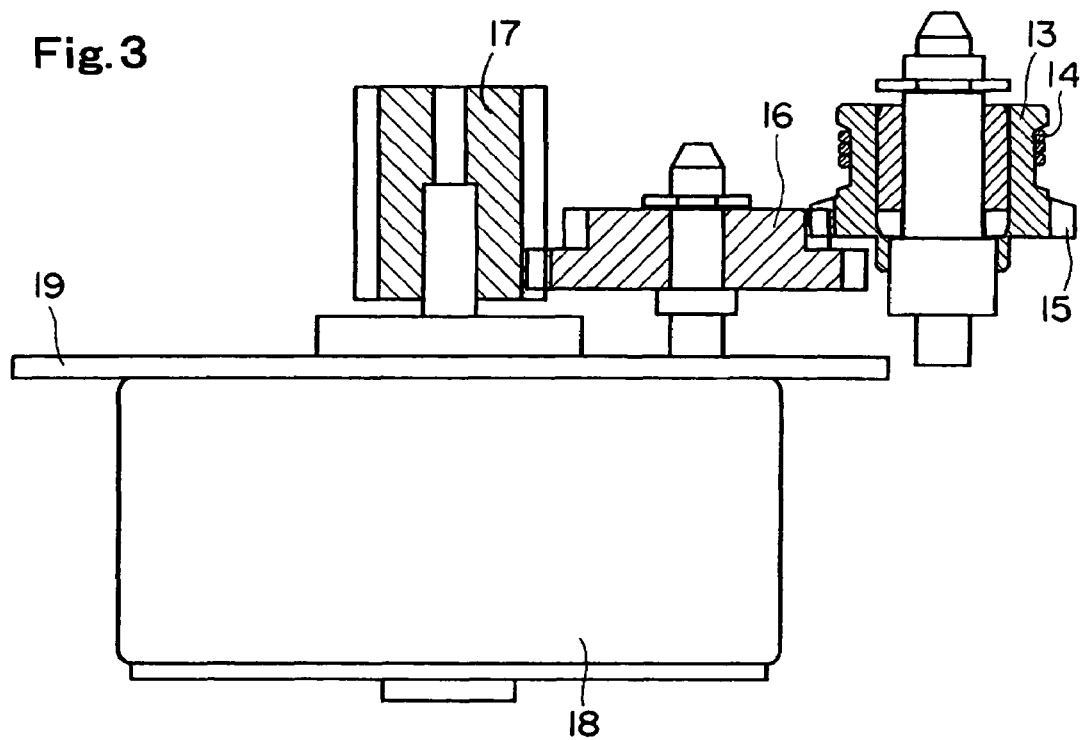
FIG. 3 is a plane view showing a drive system of pulleys of a carriage moving means.

The carriage moving means 9 moves the carriage 7 to a claw retracting position 11 and a claw protruding position 12. The claw retracting position 11 of the carriage 7 is such a position as that the claw 8 is retracted from the card carriage path 4. Moreover, the claw protruding position 12 of the carriage 7 is such a position as that the claw 8 protrudes to the card carriage path 4. As shown in FIGS. 2 and 3, this carriage moving means 9 includes pulleys 13 and 13 which have the same diameter and are arranged at two positions, i.e., the vicinity of the card insertion opening 2 and the inner side parallel to the card carriage path 4, a wire 14 which are stretched around the respective pulleys 13 and 13 and to which the carriage 7 is attached, a gear 16 which meshes with a gear portion 15 of one pulley 13, and a drive motor 18 having a pinion 17 which meshes with the gear 16. The pulleys 13, the gear 16 and the drive motor. 18 are attached to a frame 19. Therefore, the card forcible ejection mechanism 1 consists of components which are directly or indirectly disposed to the frame 19, and the entire card forcible ejection mechanism 1 can be handled as a unit.

As the drive motor 18, a stepping motor is adopted. However, the present invention is not restricted thereto, and a direct-current motor may be employed as the drive motor 18. The wire 14 is wound around each pulley 13 for a plurality of number of turns. As a result, slippage of the wire 14 relative to the pulleys 13 can be avoided.

Figure 4:
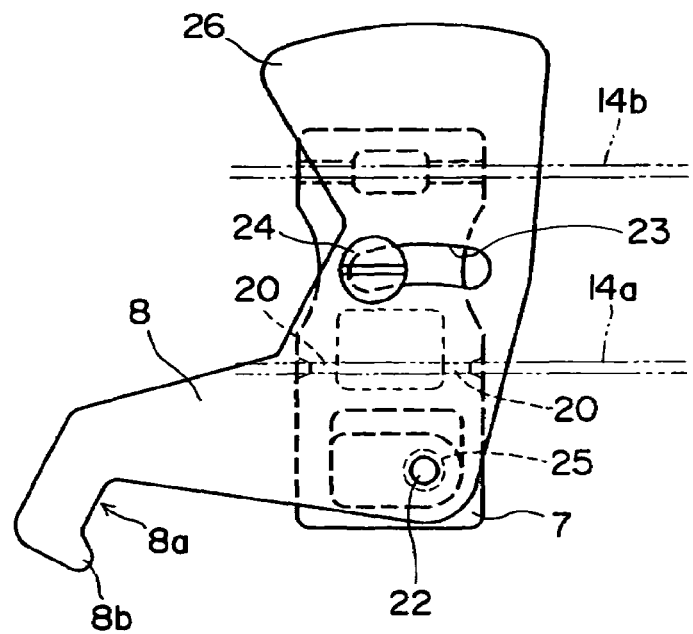
FIG. 4 is a side view showing a carriage and a claw.
Figure 5:
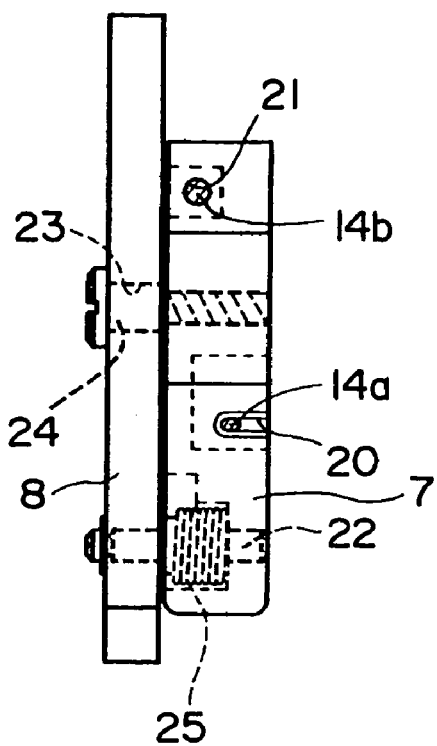
FIG. 5 is a front view showing the carriage and the claw.

As shown in FIGS. 4 and 5, the carriage 7 includes a fixed groove 20 which is fixed to a linear portion 14a of the wire 14 on the card carriage path 4 side, and a guide hole 21 provided to a linear portion 14b of the wire 14 on the opposite side so as to be capable of sliding. Furthermore, the linear portion 14a of the wire 14 on the card carriage path 4 side is fitted in and fixed to the fixed groove 20 of the carriage 7, and the linear portion 14b of the wire 14 on the opposite side pierces the guide hole 21 of the carriage 7 so as to be capable of sliding. As a result, since the carriage 7 is supported by the parallel wire 14, rotation is avoided, and the carriage 7 is moved in accordance with movement of the linear portion 14a of the wire 14 on the card carriage path 4 side while maintaining a standing posture.

One claw 8 is provided to the carriage 7. In this embodiment, one claw 8 is provided, but the present invention is not restricted thereto. The claw 8 is rotatably attached to the carriage 7 around a support shaft 22. To an end portion of the claw 8 are formed a contact portion 8a which comes into contact with a rear end 3a of the card 3 and a protrusion 8b which prevents the card 3 which is in contact with the contact portion 8a from slipping and coming off. Moreover, a restriction hole 23 which is a through hole having an arc shape with the support shaft 22 as the center is formed to a part of the claw 8. A restriction pin 24 fixed to the carriage 7 is inserted into this restriction hole 23. Therefore, a rotation range of the claw 8 is a range reaching a state that the end portion of the restriction hole 23 comes into contact with the restriction pin 24.

Figure 6:
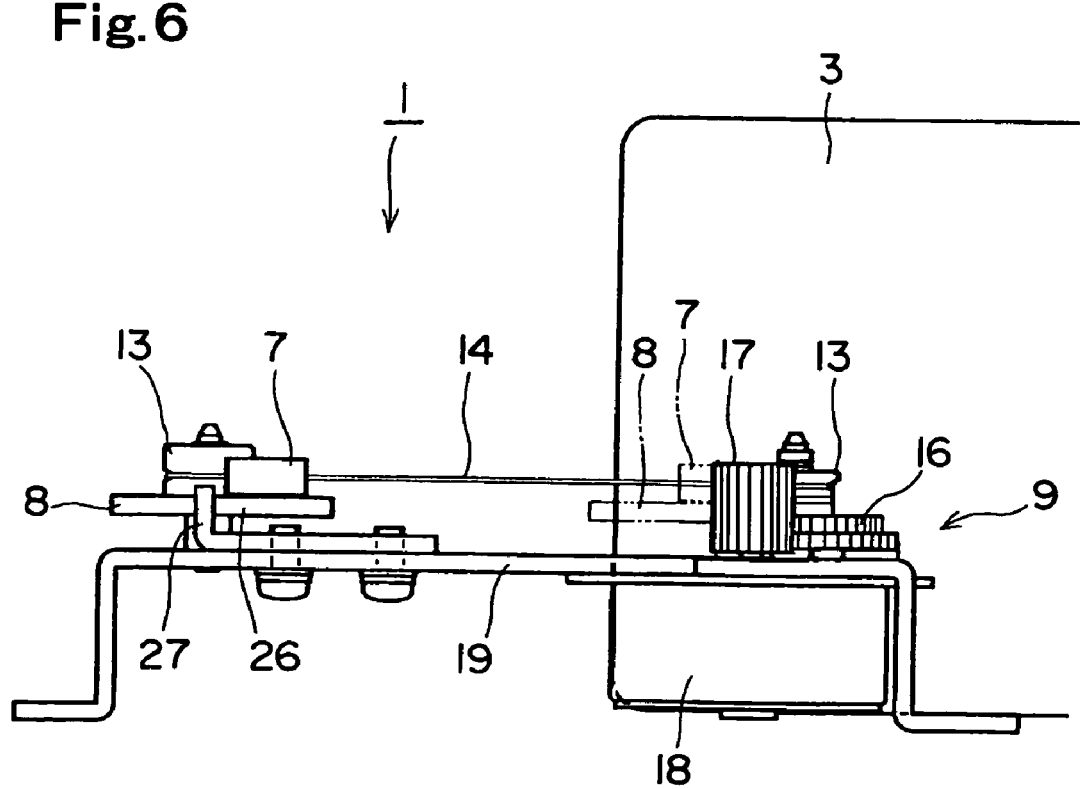
FIG. 6 is a plane view showing a card forcible ejection mechanism.
Figure 7:
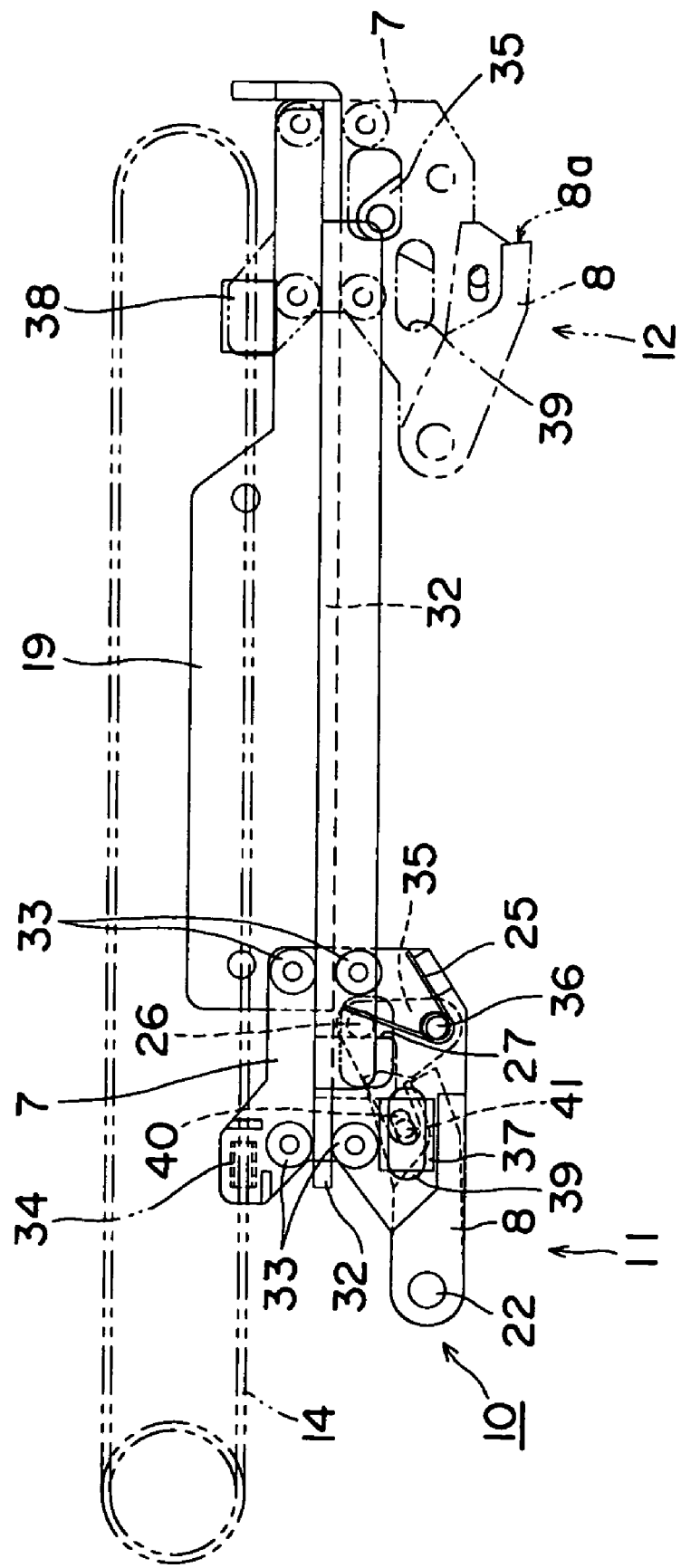
FIG. 7 is a side view showing another embodiment of a card forcible ejection mechanism.

A craw protruding/retracting mechanism 10 retracts the claw 8 from the card carriage path 4 when the carriage 7 is placed at a claw retracting position 11, and protrudes the claw 8 to the card carriage path 4 when the claw 8 is placed at a claw protruding position 12. This claw protruding/retracting mechanism 10 includes an impetus giving spring 25 which is a torsion coil spring to press the claw 8 in a direction along which the claw 8 protrudes to the card carriage path 4 and is provided to the support shaft 22 of the claw 8, a contact portion 26 integrally formed with the claw 8, and an impingement end 27 which is formed to the frame 19 as shown in FIGS. 2 and 6 and comes into contact with the contact portion 26 and retracts the claw 8 from the card carriage path 4 when the carriage 7 is placed at the claw retracting position 11. Therefore, when the carriage 7 is placed at the claw protruding position 12, since the contact portion 26 and the impingement end 27 are distanced from each other, the claw 8 is caused to protrude to the card carriage path 4 by the impetus giving spring 25. Moreover, when the carriage 7 is placed at the claw retracting position 11, since the contact portion 26 comes into contact with the impingement end 27, the claw 8 is rotated against the impetus giving spring 25 and retracted from the card carriage path 4.

As shown in FIG. 1, the card carrying means 5 includes drive rollers 28 and pad rollers 29 which are arranged so as to be opposed to each other with the card carriage path 4 therebetween, and a drive motor 30 coupled with the drive rollers 28 through a belt (not shown). Additionally, a position sensor (not shown) which detects a position of the card 3 is provided to the card carriage path 4.

Further, the entire cad forcible ejection mechanism 1 is accommodated between the roller pairs 28 and 29 which are adjacent to each other in the carriage direction. Therefore, the card forcible ejection mechanism 1 realized as a unit can be accommodated in the card reader 6 without making a wasteful space, thereby restricting an increase in size of the card reader 6.

Furthermore, a shutter 31 which opens/closes the card insertion opening 2 is provided to this card reader 6. Moreover, the claw protruding position 12 is arranged on the shutter 31 side away from the claw retracting position 11. Additionally, this card forcible ejection mechanism 1 forcibly ejects the card 3 when the shutter 31 is in contact with the retained card 3 and cannot be closed. Therefore, the card forcible ejection mechanism 1 can be provided only in the vicinity of the shutter 31, and the card forcible ejection mechanism 1 does not have to be provided over the entire card carriage path 4, thereby reducing a size of the card forcible ejection mechanism 1. Further, in cases where the card 3 is retained with the shutter 31 being closed, if the rear end 3a of the card 3 is in the operation range of the claw 8, the shutter 31 is opened to operate the card forcible ejection mechanism 1, and the card 3 is discharged.

Furthermore, as shown in FIGS. 1 and 2, the claw 8 retracted from the card carriage path 4 and the shutter 31 are separated from each other by a distance corresponding to a length L of at least one card 3 in the carriage direction. Therefore, the claw 8 can be assuredly brought into contact with the rear end 3a of the retained card 3 which overlaps a position of the shutter 31. In this embodiment L is determined as a length of one card 3. Thus, the card forcible ejection mechanism 1 can be prevented from being increased in size. However, the length of one card 3 not only means a card length in the strict sense but includes a length obtained by adding a tolerance to this length.

The operation of the above-described card forcible ejection mechanism 1 will now be described.

When the card reader 6 is in the standby state, the carriage 7 of the card forcible ejection mechanism 7 is placed at the claw retracting position 11, and the claw 8 is retracted from the card carriage path 4 as indicated by solid lines in FIGS. 1 and 2. Then, when the card 3 is inserted into the card insertion opening 2, the card 3 is detected by the position sensor and carried to the inner side by the card carrying means 5. At this moment, since the claw 8 is retracted from the card carriage path 4, the card 3 can pass through the card carriage path 4 without coming into contact with the claw 8. Moreover, when the entire card 3 is taken into the card reader 6, the shutter 31 is closed.

Then, when the card 3 is retained in the card carriage path 4 because the card 3 has a defect such as a bend or a person who tries to steal a stranger's card 3 manipulated the card reader 6, retention of the card 3 is detected from the operation state of the drive motor 30 and the detection state of the position sensor. At this moment, if it is detected that the card 3 is placed at a position overlapping the shutter 31 and the shutter 31 should be closed but it is actually opened, it is judged that the shutter 31 is in contact with the card 3 and cannot be closed, and the card forcible ejection mechanism 1 is operated. Alternatively, if it is detected that the shutter 31 is closed and the rear end 3a of the card 3 is within the operation range of the claw 8, the shutter 31 is opened, and the card forcible ejection mechanism 1 is operated.

In the card forcible ejection mechanism 1, the drive motor 18 is operated to rotate the wire 14 through the gear 16 and the pulleys 13, and moves the carriage 7 from the claw retracting position 11 to the claw protruding position 12. As a result, as indicated by chain double-dashed lines in FIGS. 1 and 2, the claw 8 protrudes to the card carriage path 4 and comes into contact with the rear end 3a of the card 3, thereby discharging the card 3 from the card insertion opening 2. Therefore, since the card 3 retained in the state that the shutter 31 is not closed is immediately discharged and returned to a user, it is possible to prevent the card 3 from being retained with the shutter 3 being not closed and a stranger from stealing the card 3 when the user walks away from the card reader 6.

As described above, according to the card forcible ejection mechanism 1 of this embodiment, since the card forcible ejection mechanism 1 is provided only in the vicinity of the card insertion opening 2, the card forcible ejection mechanism 1 can be reduced in size as compared with a case that the card forcible ejection mechanism 1 is provided over the entire card carriage path 4 like the prior art.

It is to be noted that the above-described embodiment is an example of the preferred mode of the present invention, but the present invention is not restricted thereto, and various modifications can be carried out. For example, although the claw 8 retracted from the card carriage path 4 and the shutter 31 are arranged so as to be separated from each other by a distance corresponding to a length L of one card 3 in this embodiment, the present invention is not restricted thereto, and any other length may be adopted. For example, the length L may be set so as to extend the entire area of the card carriage path 4, or it may be set shorter than the card length.

Furthermore, although the wire 14 is wound around the pulleys 13 for a plurality of number of turns in this embodiment, the present invention is not restricted thereto, and teeth may be provided to each pulley 13 and a timing belt may be wound therearound. In this case, slippage of each pulley 13 and the wire 14 can be likewise avoided. Moreover, the present invention is not restricted to winding the wire 14 or the timing belt around the pulleys 13, and a part of the wire 14 may be fixed to the pulleys 13. In this case, a fixing position is determined so as to assure a necessary operation range of the carriage 7. According to this, slippage of the wire 14 can be further suppressed.

Additionally, in each of the foregoing embodiments, although the carriage 7 is guided to the linear portion 14*b* which is away from the card carriage path 4 of the wire 14 and the posture is maintained, the present invention is not restricted thereto, and a guide shaft parallel to the card carriage path 4 may be provided so that the carriage 7 can be guided thereto.

Further, in the foregoing embodiments, although the card forcible ejection mechanism 1 is arranged on the upper side of the card carriage path 4, the present invention is not restricted thereto, and the card forcible ejection mechanism 1 may be arranged on the lower side of the card carriage path 4.

Furthermore, in the foregoing embodiments, although the card forcible ejection mechanism 1 is provided in the vicinity of the card insertion opening 2, it may be provided in the vicinity of a card disposition box (not shown) provided on the inner side of the card reader 6 according to circumstances. In this case, the claw protruding position 12 is arranged on the card disposition box side away from the claw retracting position 11. As a result, when the card 3 is retracted in the inner part of the card reader 6, the card 3 can be discharged into the card disposition box.

Furthermore, in the foregoing embodiments, the shutter 31 is opened and the card 3 is discharged when the card 3 is retained if the shutter 31 is closed and the rear end 3*a* of the card 3 is in the operation range of the claw 8. However, the present invention is not restricted thereto, and the card forcible ejection mechanism 1 may not be operated when the shutter 31 is closed even though retention of the card 3 is detected. In this case, since the shutter 31 is closed and stealing the card 3 is very difficult, a possibility of a theft is small even though the card forcible ejection mechanism 1 is not operated.

Moreover, although the carriage 7 is supported by the wire 14 which moves the carriage 7 so as to be capable of sliding in each of the foregoing embodiments, a support structure of the carriage 7 is not restricted thereto. For example, as shown in FIGS. 7 to 10, the carriage 7 may be supported by a guide rail 32 fixed to the frame 19 so as to be capable of sliding.

In this case, the carriage 7 includes respective pairs of rollers 33, i.e., four sets of rollers in total, capable of rotating with the guide rail 32 therebetween, which are distanced from each other on the right and left sides in the longitudinal direction of the guide rail 32. Further, the carriage 7 includes a fixed piece 34 fixed to the wire 14 of carriage moving means (not shown in FIGS. 7 to 10) 9. It is to be noted that a pair of the rollers 33 are provided so as to sandwich the guide rail 32 in this embodiment, the present invention is not restricted thereto, and it is good enough to provide at least the rollers 33 on which a reactive force acts when the claw 8 discharges the card 3, i.e., the roller 33 close to the claw 8 which is a roller 33*a* set on the claw 8 side with the guide rail 32 therebetween, and the roller 33 away from the claw 8 which is a roller 33*d* set on a side opposite to the claw 8 with the guide rail 32 therebetween. In this case, the carriage 7 can be supported by the wire 14 and the rollers 33*a* and 33*d* without being inclined, and the reactive force can be received by the rollers 33*a* and 33*d* when forcibly discharging the card 3.

Further, the claw 8 which protrudes/retracts to/from the card carriage path 4 by rotation is supported to this carriage 7. The claw 8 has an end directed toward the card insertion opening 2 away from the support shaft 22, and its end is determined as a contact portion 8*a* which is upwardly inclined so as to slightly give a force in a direction along which it lifts up the card 3 from the card carriage path 4. The contact portion 8*a* generates a force acting to cause the claw 8 to further bite into the card 3 when it comes into contact wit the rear end portion 3*a* of the card 3.

The claw protruding/retracting mechanism 10 which protrudes/retracts this claw 8 to/from the card carriage path 4 includes at least an arm 35 which is linked with the claw 8 and rotates the claw 8, an impetus giving spring 25 which rotates the arm 35 and constantly presses the claw 8 in a direction along which the claw 8 protrudes to the card carriage path 4, and an impingement end 27 which counterrotates the arm 35 against the impetus giving spring 25 and retracts the claw 8 from the card carriage path 4 when the carriage 7 moves to the claw retracting position 11. The claw 8 which is rotatably held to the carriage 7 has a slot 40, inserts a pin 41 connected with the arm 35 into the slot 40 and rotates the claw 8 by rotation of the arm 35. Furthermore, the arm 35 is rotatably attached to the carriage 7 by a support shaft 36, and constantly pressed in a direction along which it protrudes toward the card carriage path 4 by the impetus giving spring 25 constituted of a helical coil spring wound around the support shaft 36. The impetus giving spring 25 has one end being in contact with a stopper 42 provided to the carriage 7 and the other end being contact with the contact portion 26 integrally formed to the arm 35, and gives an impetus so as to protrude the arm 35 or the claw 8 to the card carriage path 4. Moreover, the guide rail 32 includes an impingement end 27 which comes into contact with the contact portion 26 of the arm 35 and turns the impetus giving spring 25 in a direction of twisting, i.e., a direction along which the claw 8 is retracted from the card carriage path 4 when the carriage 7 is placed at the claw retracting position 11.

Therefore, the carriage 7, the claw 8 and the arm 35 form a link through a slider (consisting of a slot 40 and a connecting pin 41), and the claw 8 is forcibly rotated by rotation of the arm 35. Additionally, when the carriage 7 is placed at the claw protruding position 12 (FIGS. 9 and 10), since the contact portion 26 and the impingement end 27 are distanced from each other, the impetus of the impetus giving spring 25 is transmitted to the claw 8 through the arm 35, and the claw 8 is caused to protrude to the card carriage path 4. Further, when the carriage 7 is placed at the claw retracting position 11 (FIG. 8), since the contact portion 26 comes into contact with the impingement end 27, the arm 35 is rotated against the impetus giving spring 25, and the claw 8 is retracted from the card carriage path 4.

Furthermore, to each stroke end of the carriage 7 are provided a retracting position sensor 37 which detects that the carriage 7 is placed at the claw retracting position 11 and a protruding position sensor 38 which detects that the carriage 7 is placed on the side closest to the card insertion opening 2 side at the claw protruding position 12. In this embodiment, a reflecting type photoelectric switch is used as each of the sensors 37 and 38. Here, the retracting position sensor 37 is provided so as to be capable of confirming that the carriage 7 is placed at the claw retracting position 11 and also the claw 8 is retracted. That is, a through hole 39 is provided to the carriage 7 in such a manner that it overlaps the claw 8 in a rotary axis direction at a position of the claw 8 (shown in FIG. 8) retracted from the card carriage path 4, and that it does not overlap the claw in the rotary axis direction at a position of the claw 8 (FIG. 9) protruding to the card carriage path 4, and presence/absence of the claw 8 and existence of the carriage 7 are detected by utilizing a fact that a light ray passing via this through hole 39 is reflected by the claw 8 and returns. It is preferable that at least a surface of the carriage 7 around the through hole 39 is formed as a non-reflecting surface blackened by applying, e.g., a coating material so as to prevent the light from the photoelectric switch from being reflected. Since there is adopted the retracting position sensor 37 having a structure to confirm existence of the claw 8 via the through hole 39, it is possible to detect, e.g., that the claw 8 cannot be retracted from the card carriage path 4 for some reason even if the carriage 7 is placed at the claw retracting position 11 or that the claw 8 falls off or intentionally removed. Therefore, it is possible to take a countermeasure to, e.g., stop using the card reader by performing a control such as keeping the closed state of the shutter mechanism at the card insertion opening, or prevent erroneous detection that the claw 8 is retracted from the card carriage path 4.

Figure 8:
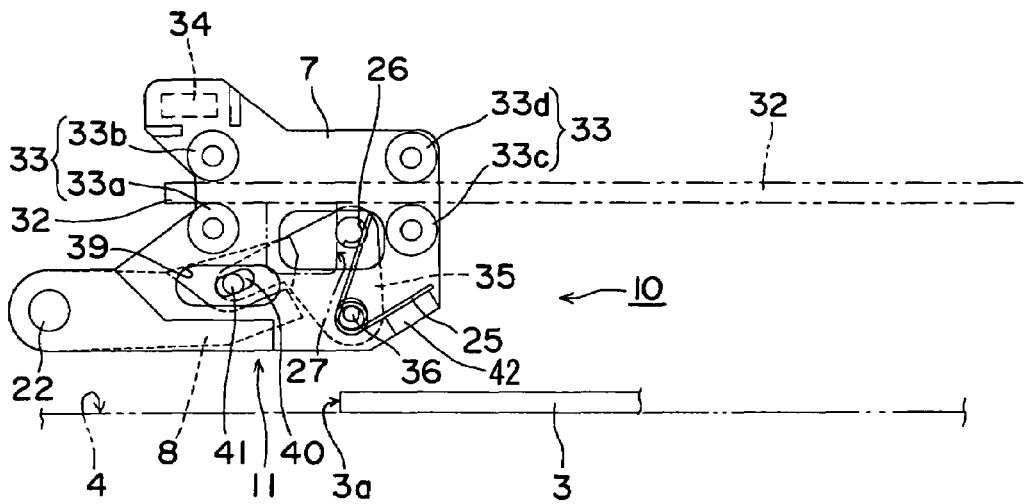
FIG. 8 is a side view showing a state that the carriage of the card forcible ejection mechanism depicted in FIG. 7 is placed at a claw retracting position.
Figure 9:
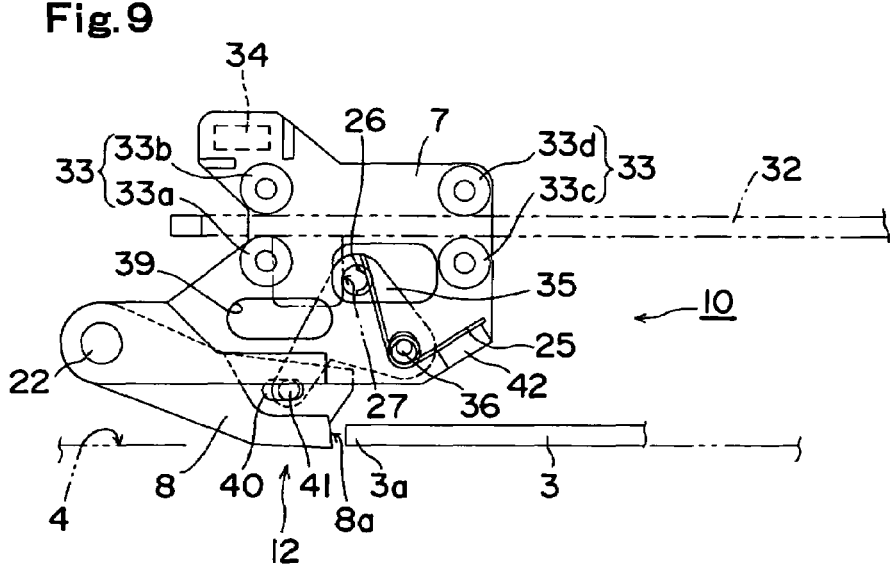
FIG. 9 is a side view showing a state that the claw of the card forcible ejection mechanism depicted in FIG. 7 is protruding to the card carriage path.
Figure 10:
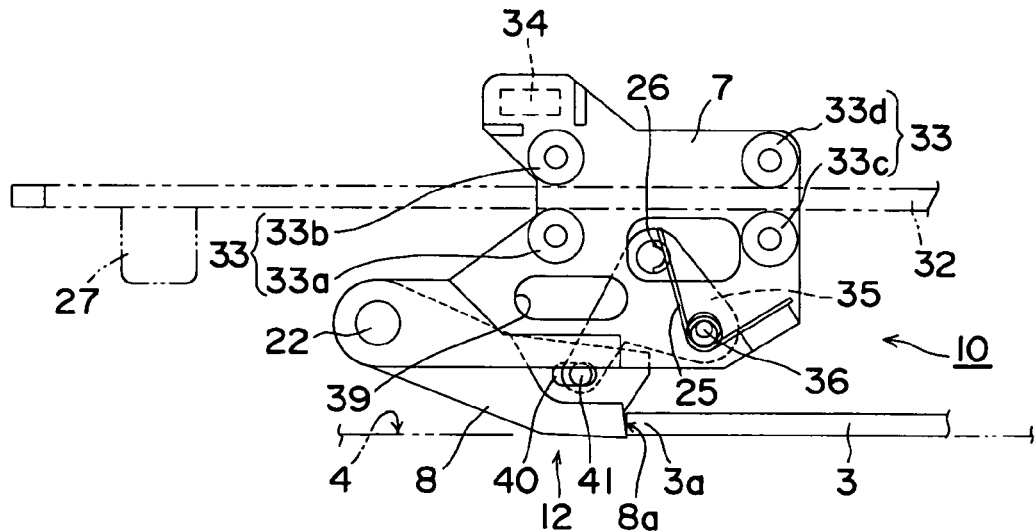
FIG. 10 is a side view showing a state lo that the claw of the card forcible ejection mechanism depicted in FIG. 7 thrusts a card.
Figure 11:
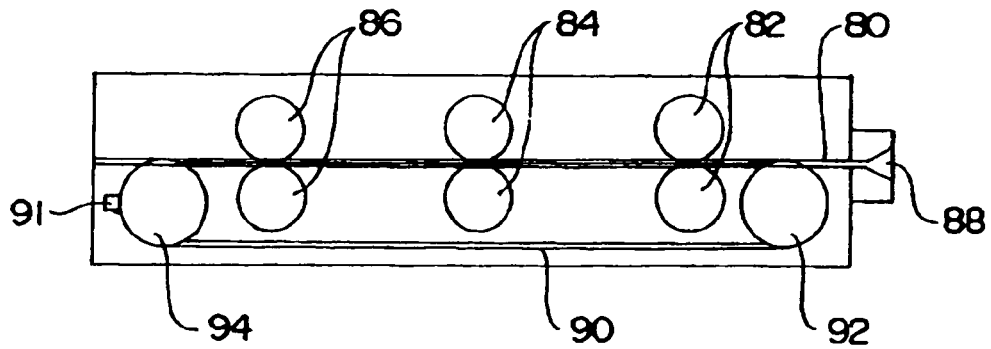
FIG. 11 is a side view showing a conventional card forcible ejection mechanism.

The operation of this card forcible ejection mechanism 1 will now be described hereinafter. As shown in FIG. 8, when the carriage 7 is placed at the claw retracting position 11, since the contact portion 26 of the arm 35 comes into contact with the impingement end 27 of the guide rail 32, the arm 35 is rotated against the impetus giving spring 25, and the claw 8 is retracted from the card carriage path 4. At this moment, the retracting position sensor 37 detects the retraction of the claw 8 by utilizing the light ray passing through the through hole 39 of the carriage 7. Then, as shown in FIG. 9, when the carriage 7 moves by movement of the wire 14 and a pressing force from the contact portion 26 to the impingement end 27 is weakened, the arm 35 is rotated by the impetus of the impetus giving spring 25, and the claw 8 protrudes to the card carriage path 4. Moreover, as shown in FIG. 10, the claw 8 pushes the rear end 3a of the card 3 by movement of the carriage 7, and forcibly discharges the card 3 so as to thrust it.

Additionally, although the carriage 7 is held by the rollers 33 so as to be capable of sliding in the card forcible ejection mechanism 1 illustrated in FIGS. 7 to 10, the present invention is not restricted thereto, and a material with the excellent sliding property such as polyacetal may be utilized as a slider without using the rotating members such as the rollers 33 so that the carriage 7 can slide. Further, although the claw 8 is caused to protrude/retract by utilizing the arm 35, the contact portion 26 and the impingement end 27 in this embodiment, the present invention is not restricted thereto, and the claw 8 may be caused to protrude/retract by using a cam provided to the guide rail 32.

What is claimed is:

1. A card forcible ejection mechanism which is provided to a card reader including a card carrying means for carrying a card inserted from a card insertion opening through a card carriage path, and forcibly discharges the card retained in the card carriage path, comprising: a carriage which moves along a carriage direction of the card and is provided separately from the card carrying means; at least one claw provided to the carriage and protrudes to or retracts from the card carriage path; a carriage moving means for moving the carriage to a claw retracting position and a claw protruding position; and a claw protruding or retracting mechanism which retracts the claw from the card carriage path when the carriage is placed at the claw retracting position and protrudes the claw to the card carriage path when the carriage is placed at the claw protruding position;

wherein the carriage moving means and the card carrying means are provided with separate motors so that the carriage, the carriage moving means, and the claw protruding or retracting mechanism are realized as a unit and attached to the card reader; and, the motor of the carriage moving means operates the carriage moving means to move the carriage from the claw retracting position to the claw protruding position, resulting in the claw protruding to the card carriage path so that the card retained in the card carriage path is forcibly discharged.

2. The card forcible ejection mechanism according to claim 1, wherein the entire card forcible mechanism is realized as a unit and attached to the card reader.

3. The card forcible ejection mechanism according to claim 1, wherein the card carrying means includes carriage rollers, and the entire card forcible ejection mechanism is accommodated between the carriage rollers adjacent to each other along the carriage direction.

4. The card forcible ejection mechanism according to claim 1, wherein the mechanism further comprises a shutter which opens or closes the card insertion opening, the claw protruding position is arranged on the shutter side away from the claw retracting position, and the card is forcibly discharged only when the shutter is in contact with the retained card and cannot be closed.

5. The card forcible discharge mechanism according to claim 4, wherein the claw retracted from the card carriage path and the shutter are separated from each other by a distance corresponding to a length of at least one card in the carriage direction.

* * * * *